US006988032B2

(12) United States Patent
Chiang

(10) Patent No.: US 6,988,032 B2
(45) Date of Patent: Jan. 17, 2006

(54) GENERATING VEHICLE TRAFFIC DATA FROM RAW LOCATION DATA FOR MOBILE UNITS

(75) Inventor: Tung Ching Chiang, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 20 days.

(21) Appl. No.: 10/424,753

(22) Filed: Apr. 29, 2003

(65) Prior Publication Data

US 2004/0220721 A1 Nov. 4, 2004

(51) Int. Cl.
*G01C 21/34* (2006.01)
*G06F 19/00* (2006.01)

(52) U.S. Cl. ........................ 701/117; 701/118; 701/207; 701/200; 73/178 R; 340/988; 340/995.13

(58) Field of Classification Search ................ 701/117, 701/118, 200, 207, 36, 1; 340/988, 995.13; 73/178 R
See application file for complete search history.

(56) References Cited

U.S. PATENT DOCUMENTS 5,438,517 A * 8/1995 Sennott et al. .............. 701/213
5,680,313 A * 10/1997 Whittaker et al. .......... 701/300
5,956,250 A * 9/1999 Gudat et al. .................. 701/26
6,081,230 A * 6/2000 Hoshino et al. ....... 342/357.06
6,321,092 B1 * 11/2001 Fitch et al. .............. 455/456.5
6,339,746 B1 * 1/2002 Sugiyama et al. .......... 701/209
6,466,862 B1 * 10/2002 DeKock et al. ............. 701/117
6,529,159 B1 * 3/2003 Fan et al. .............. 342/357.09
6,680,694 B1 * 1/2004 Knockeart et al. ..... 342/357.09
6,707,421 B1 * 3/2004 Drury et al. ............. 342/357.1
2002/0003831 A1 * 1/2002 Hashimoto .................. 374/144
2002/0045455 A1 * 4/2002 Spratt .......................... 455/456
2002/0186166 A1 * 12/2002 Spratt .......................... 342/464
2002/0193121 A1 * 12/2002 Nowak et al. .............. 455/456
2003/0016130 A1 * 1/2003 Joao ........................... 340/539
2004/0030448 A1 * 2/2004 Solomon .................... 700/245
2004/0030449 A1 * 2/2004 Solomon .................... 700/245
2004/0030450 A1 * 2/2004 Solomon .................... 700/245
2004/0030451 A1 * 2/2004 Solomon .................... 700/245
2004/0030570 A1 * 2/2004 Solomon ....................... 705/1
2004/0030571 A1 * 2/2004 Solomon ....................... 705/1
2004/0068351 A1 * 4/2004 Solomon ..................... 701/24
2004/0068415 A1 * 4/2004 Solomon ....................... 705/1
2004/0068416 A1 * 4/2004 Solomon ....................... 705/1
2004/0104842 A1 * 6/2004 Drury et al. ........... 342/357.13

* cited by examiner

*Primary Examiner*—Olga Hernandez

(57) ABSTRACT

Where raw location data representing a position of the one or more mobile units is available, vehicular traffic data representing a position of one or more vehicles can be generated based on the raw location for the one or more mobile units. Such generation of vehicular traffic data can include speed-based filtering and/or position-based filtering of the raw location data.

21 Claims, 2 Drawing Sheets

GENERATING VEHICLE TRAFFIC DATA FROM RAW LOCATION DATA FOR MOBILE UNITS

BACKGROUND OF THE INVENTION

An Intelligent Transportation System (ITS) is a system that provides information to assist travelers and operators, respectively, to make intelligent decisions while driving and to control traffic on road networks. It can be considered as an adaptive/feedback system from a control point of view. An ITS can increase efficiency, safety, productivity, energy savings, and environmental quality (e.g., by pollution level reduction associated with easing of traffic congestion). An ITS makes use of computing resources (hardware/software), control devices, sensors, and communication networks, as well as other technologies.

To control traffic on roadways efficiently, the Background Art has collected traffic data traditionally by using sensors installed on roads or at roadsides. The traffic data can then be transmitted to a control and command center that has systems to process the data and control guidance devices, e.g., traffic lights and/or dynamic roadway signage. For providing a more efficient public transportation system, locations and load information of public vehicles can be fed into yet another control system for scheduling and providing arrival information to awaiting passengers. Automatic electronic toll systems installed in highways are also considered part of an ITS. These systems not only can reduce the line at toll booths (hence increasing roadway efficiency), but also can provide convenience to the travelers.

SUMMARY OF THE INVENTION

The invention provides a method of gathering/harvesting vehicular traffic data based on information collected from wireless mobile units and a related enhanced intelligent traffic system (EITS) that augments the existing traffic data with the mobile-unit-derived traffic data. In the invention, existing location techniques for locating a wireless mobile unit may be used to generate position information for the mobile unit over time. A portion of the mobile units typically move with (are being carried by) vehicles, so the position information for the wireless mobile units can be treated as a form of raw data that includes possible vehicle position information.

According to the invention, through the use of filtering techniques, wireless mobile units that are moving with vehicles can be discriminated and their data treated as the corresponding data of the vehicles, respectively. As a byproduct of the filtering techniques, the speed of the vehicles may be determined. An aggregate of such vehicle data may be treated as traffic data by (and stored in) the EITS. This additional traffic data increases the amount of information upon which traffic control and traffic information reports are based.

BRIEF DESCRIPTION OF THE DRAWINGS

The invention will become more fully understood from the detailed description given below and the accompanying drawings, wherein like elements are represented by like reference numerals, which are given by way of illustration only and thus are not limiting on the invention and wherein.

DETAILED DESCRIPTION OF EXAMPLE EMBODIMENTS

Figure 1:
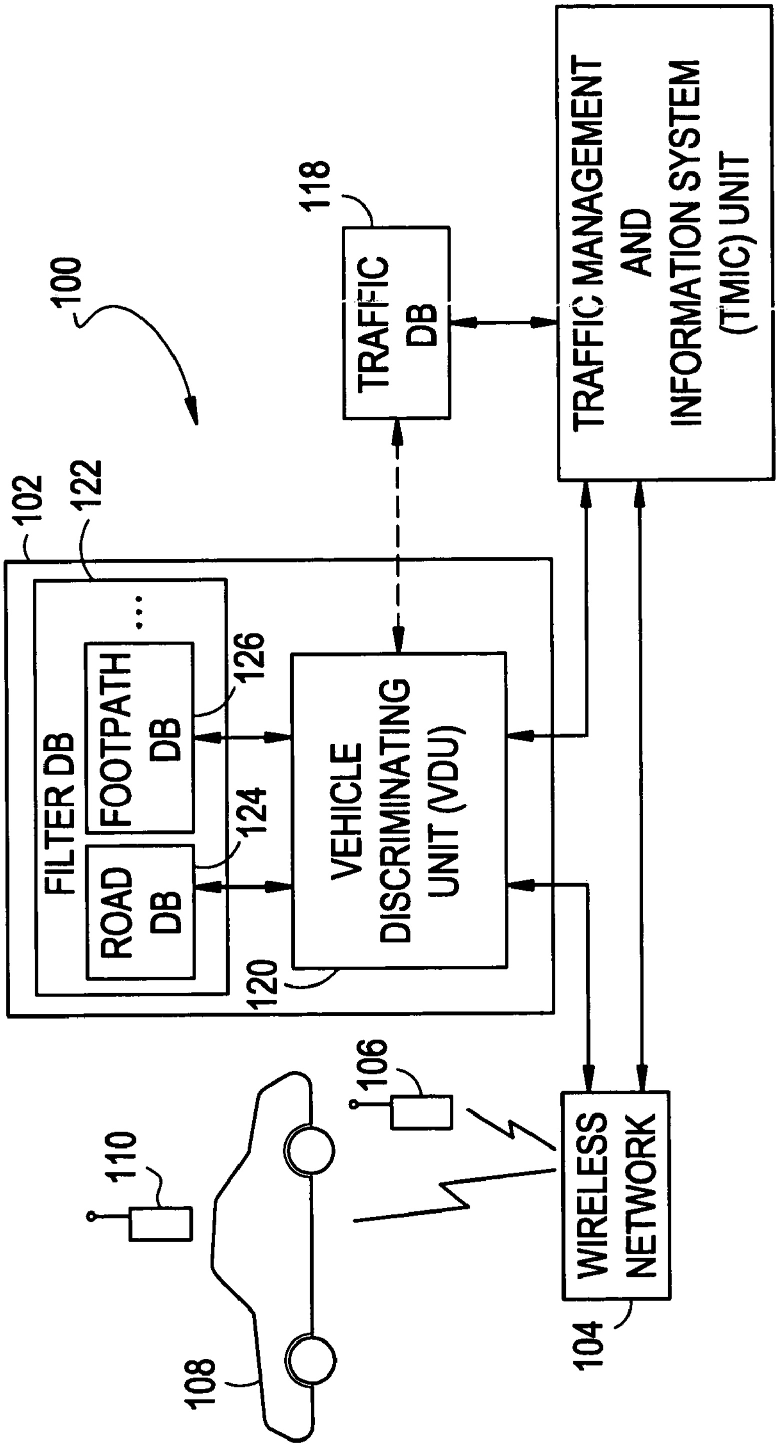
FIG. 1 is a block diagram of an enhanced intelligent traffic system.

FIG. 1 is a block diagram of an enhanced intelligent traffic system (EITS) 100. The system 100 includes a wireless network 104 that collects raw location data for mobile units, such as the mobile units 106 and 110 shown in FIG. 1, currently being served by the wireless network 104. For example, the mobile units 106 and 110 may include a global positioning system (GPS) sensor and send geolocation information (e.g., longitude or latitude coordinates or longitude, latitude and altitude coordinates) generated by the GPS sensor to the wireless network 104. However, any well-known mobile-unit-location-determining technique may be used to generate the location data. The raw location data may further include a time stamp indicating a time at which the location data was obtained. As will be described in greater detail below, the time stamp can facilitate a determination of the speed or velocity of a mobile unit.

The mobile-unit 106 and/or 110 can be a wireless telephone, a wireless personal data assistant (PDA) (with or without telephony capability), etc. The mobile unit 110 is representative of vehicle-born mobile units and is shown on a vehicle 108 to convey that it moves with the vehicle 108. Vehicle-born mobile units may be hard-wired into the vehicle 108, carried by a driver or passenger, etc. The mobile unit 106 is representative of non-vehicle born mobile units. It is to be understood that typically there are many units 106 and 110 served by the wireless network 104. In FIG. 1, only one mobile unit 106 and one mobile unit 110 have been shown for simplicity.

A harvesting unit 102 receives the raw location data from the wireless network 104, and harvests/generates vehicle traffic data from the raw location data supplied by a wireless network 104. Specifically, the harvesting unit 102 filters the raw location data to determine which of the raw location data does and does not correspond to vehicle-born mobile units. The harvesting unit 102 filters out the raw location data corresponding to non-vehicle-born mobile units 106 but retains the raw location data corresponding to the vehicle-born mobile units 110.

Because the mobile units 110 move with the vehicles 108, the raw location data for the mobile units 110 can be treated as vehicle location data for the vehicles 108. Each vehicle is separately identified, e.g., based on an identifier of the mobile unit with which the associated position data is tagged. In addition to this vehicle location data, the harvesting unit 102 may generate speed or velocity data by determining the change in vehicle location data for a vehicle (identified by the associated mobile unit) over time. Traffic data can be formed by aggregating (for plural vehicles) the resulting vehicle location data and, optionally, the speed or velocity data for the vehicle. The operation or the harvesting unit 102 will be described in greater detail below.

The harvesting unit 102 may provide the vehicle traffic data to a traffic management and information system (TMIC) unit 116. The TMIC unit 116 can incorporate the vehicle traffic data into a traffic database 118. Alternatively (as indicated by a communication path depicted as a phantom line), the harvesting unit 102 may directly incorporate the vehicle traffic data into the traffic database 118.

As shown in FIG. 1, the harvesting unit 102 includes a vehicle discriminating unit (VDU) 120 (e.g., software hosted by a typical computer) and a filter database 122 of vehicle-relevant areas. The filter database may include a "roadway" database 124 and a "footpath" database 126. The roadway database 124 provides position information on the known vehicular traffic areas, e.g., the system of roads, in the geographic region served by the wireless network 104. The footpath database 126 provides position information on the known pedestrian traffic areas, e.g., sidewalks and footpaths, in the geographic region served by the wireless network 104. An example of an unsophisticated footpath database 126 is merely the reciprocal of the roadway database 124, i.e., any part of the geographic region served by the wireless network 104 that is not part of the roadway database 124 is assumed to be for pedestrian traffic.

It will be appreciated from the forgoing and following disclosure that the filter database 122 may include several additional databases such as a railway database, building database, etc. It will also be understood that the databases included in the filter database 122 are a matter of design choice. For example, in one example embodiment, the filter database only includes the roadway database.

Figure 2:
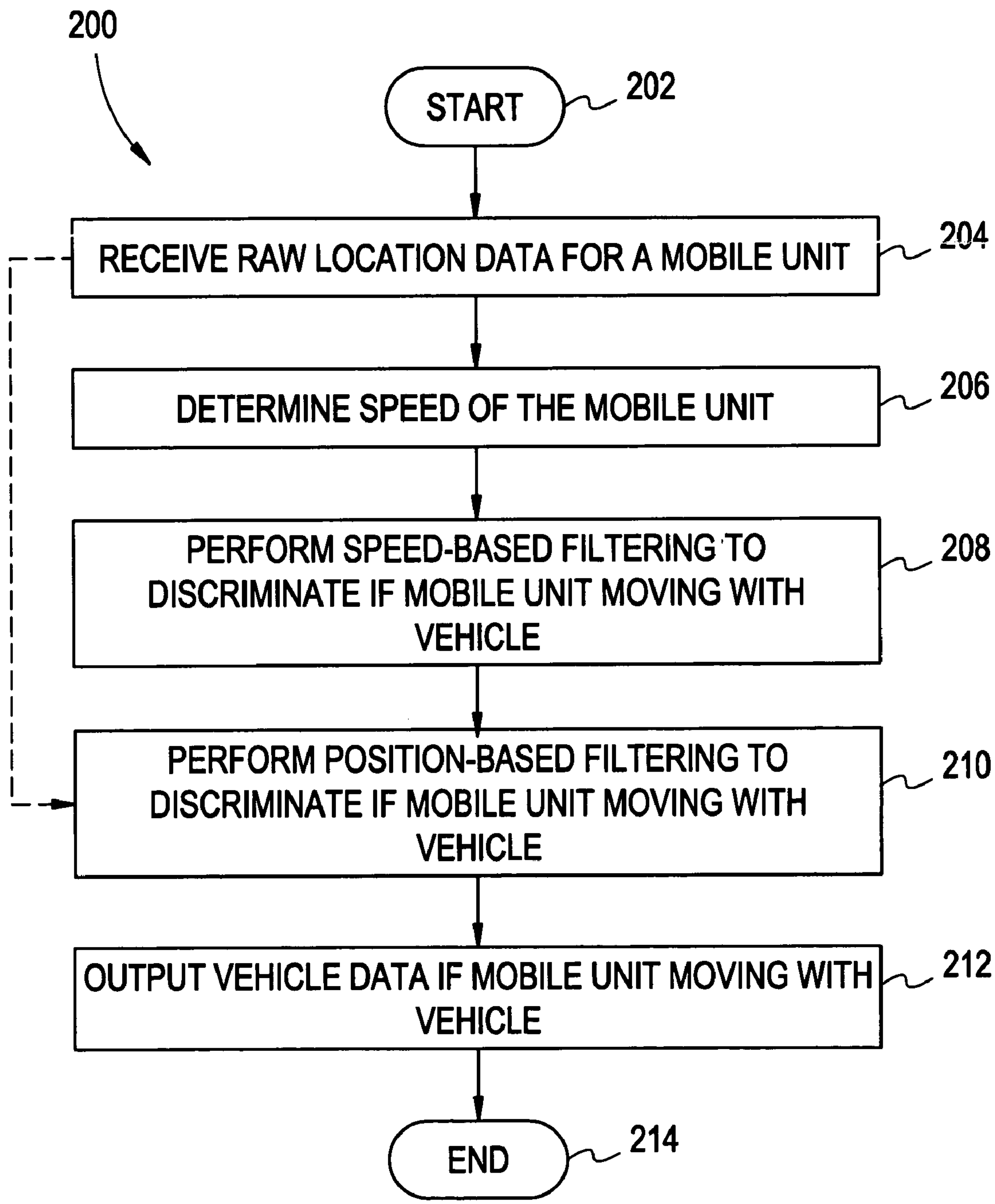
FIG. 2 is a flowchart of data harvesting performed by the enhanced intelligent traffic system.

Next, the operation of the harvesting unit 102 will be described in detail with respect to FIG. 2. The flowchart of FIG. 2 illustrates a method of gathering vehicle traffic data according to one embodiment of the invention. For simplicity, FIG. 2 is couched in terms of one mobile unit. But it is to be understood that the same is applied to however many mobile units are represented in the raw location data received from the wireless network 104.

As shown, in step S204, the VDU 120 receives the raw location data from the wireless network 104. Then, in step S206, the VDU 120 determines the speed of a mobile unit from the raw location data.

As an example implementation of step S206, the VDU 120 can determine the speed of a mobile unit 106/110 based upon two positions of the vehicle, e.g., successive positions. The distance between the two successive positions of a mobile unit 106/110 is derived. Then the difference is divided by the time elapsed between the two successive position determinations. The VDU 120 can recognize position data pertaining to a particular mobile unit because position data for each mobile unit is tagged with an identification based upon the mobile unit. Also, the position data is typically tagged with a time stamp. If data for several positions of a vehicle are available, the time stamps can be compared to determine, e.g., the two most recent positions. From the coordinates for the two most recent positions, the VDU 120 can derive the distance that the mobile unit has moved, i.e., the distance between the two most recent positions. From the time stamps for the two most recent positions, the VDU 120 can determine the elapsed time. Then the VDU 120 can calculate the speed by dividing the distance-moved by the elapsed time.

Optionally, the accuracy of the speed determined by step S206 can be improved by averaging or integrating multiple speed values.

In step S208, the VDU 120 performs speed-based filtering of the speed data for the mobile unit. Recognizing that vehicle-born mobile units 110 typically move at a much greater speed than mobile units 106 (which are typically carried by pedestrians, i.e., are pedestrian-born), the speed-based filtering can include: comparing the speed data against a predetermined reference value; and treating data for the mobile unit as representing data for the vehicle if the result of the comparison indicates that the mobile unit is moving with the vehicle.

As an example implementation of step S208, the predetermined reference value can be a minimum speed (SMIN) for a typical vehicle. The VDU 120 compares the speed data of the mobile unit against SMIN. If the speed (S) satisfies $S>SMIN$ or $S\geqq SMIN$, then the VDU 120 treats the mobile unit as representing a vehicle.

As another example implementation of step S208, the predetermined reference value can be a maximum speed (SMAX) for a typical pedestrian. Again, the VDU 120 compares the speed data of the mobile unit against SMAX. If the speed (S) satisfies $S>SMAX$ or $S\geqq SMAX$, then the VDU 120 treats the mobile unit as representing a vehicle.

If it is determined in step S208 that the mobile unit represents a vehicle, then step S208 can further include the VDU 120 generating vehicle data as follows. The VDU 120 can: assign an identifier to the vehicle; and adopt, as the vehicle's position coordinates and time stamps, the position coordinates and time stamps, respectively, of the mobile unit. Additionally, the VDU 120 can incorporate the speed data derived for the vehicle (see step S206 above) as part of the vehicle data. The vehicle identifier assigned to the vehicle can be based upon the identifier for the mobile unit, e.g., the vehicle identifier can be the same as the mobile unit identifier; alternatively, the vehicle identifier does not have to be based upon the mobile unit identifier.

There are circumstances in which the speed-based filtering of step S208 might not recognize a mobile unit that is actually moving with a vehicle. Such a mobile unit might be a mobile unit 110 whose vehicle 108 is caught in slow traffic or a traffic-jam situation. The vehicle data harvested from such a mobile unit 110 can be important to an EITS 100, so a position-based filtering (step S210) is provided to identify such mobile units, i.e., vehicles. It should be noted that if step S208 determines that the mobile unit is moving with a vehicle, then step S210 can be skipped. For the purposes of discussion, it will be assumed that it has not been determined in step S208 that the mobile unit is moving with a vehicle.

In step S210, the VDU 120 performs position-based filtering of the position data for the mobile unit. Step S210 is based upon the assumption that a mobile unit 110 whose vehicle 108 is caught in slow traffic or a traffic-jam situation will be found in a vehicular-traffic area, not in a pedestrian-traffic area. The VDU 120 can filter based upon position by comparing the position data for the mobile unit against the content of the filter database 122 of vehicle-relevant areas.

As an example implementation of step S210, let the filter database 122 of vehicle-relevant areas be the road database 124. The VDU 120 can compare the position of the mobile unit against the road database 124. If the mobile unit's position is on or within a predetermined distance of a vehicular traffic area listed in the road database 124, then the VDU 120 can treat the mobile unit as being a vehicle-born mobile unit 110 whose position and speed data represent that of the corresponding vehicle 108.

As another example implementation of step 210, let the filter database 122 of vehicle-relevant areas be the footpath database. The VDU 120 can compare the position of the mobile unit against the footpath database 126. If the mobile unit's position is not on, or not within a predetermined distance of, a pedestrian traffic area listed in the footpath database 126, then the VDU 120 can treat the mobile unit as being a vehicle-born mobile unit 110 whose position and speed data represent that of the corresponding vehicle 108.

If it is determined in step S210 that the mobile unit represents a vehicle, then step S210 can further include generating corresponding vehicle data, as discussed above. Again, the VDU 120 can: assign an identifier to the vehicle; adopt, as the vehicle's position coordinates and time stamps, the position coordinates and time stamps, respectively, of the mobile unit; and (optionally) incorporate the speed data derived for the vehicle (see step S206 above) as part of the vehicle data. A vehicle identifier can be assigned to the vehicle as discussed above (see step S208).

At step S212, assuming one of step S2308 and S210 determines that the mobile unit is vehicle-born, then the VDU 120 outputs the vehicle data. Again, FIG. 2 is couched in terms of one mobile unit for simplicity, but the same is applied to however many mobile units are represented in the raw location data. An aggregate of the vehicle data for all of the mobile units determined to be vehicle-born represents the traffic data outputted by the VDU 120. Step S212 sends the vehicle traffic data to the TMIC 116 and/or traffic database 118.

While the embodiment of the method for gathering vehicle traffic data discussed above with respect to FIG. 2 describes speed-based filtering being performed before the position-based filtering, it will be understood that the position-based filtering could be performed before the speed-based filtering, or either of the speed-based or position-based filtering could be eliminated. The elimination of the speed-based filtering is shown in FIG. 2 as a path (in phantom lines) from step S204 directly to step S210.

As an alternative, the step S206 could determine velocity (speed and heading) rather than just speed. The step S208 could become a velocity-based filtering, or just the speed component of the velocity could be used for the speed-based filtering of step S208.

As another alternative to being speed-based, steps S206–S208 can be based upon a distance moved by the mobile unit. In more detail, step S206 can derive the distance (D) moved by the mobile unit between two successive instances of position data. This alternative assumes that a predetermined amount of time (or delta) elapses between successive geolocation determinations, the delta being sufficiently short so that only a vehicle 108 should be capable of moving a reference distance (or greater). Correspondingly, step S208 can be a distance-based filtering, e.g., comparing the distances against the reference distance, etc. Example implementations of step S208 include: the predetermined reference distance being a minimum distance (DMIN) moved by a typical vehicle such that if D>DMIN or D≧DMIN, then the mobile unit represents a vehicle; or the predetermined reference value being a maximum distance (DMAX) moved by a typical pedestrian such that if D>DMAX or D≧DMAX, then the mobile unit represents a vehicle.

Further in the alternative, additional filtering can be added to the flowchart 200 of FIG. 2. For example, the step S210 can include a second type of position-based filtering to recognize the situation in which a mobile unit is being carried on a train and/or an airplane. In the train situation, a train database of known train, subway, etc., areas can be provided. The position-based filtering can compare the position data for the mobile unit against the train database, etc. In the airplane situation, the altitude component of three-dimensional position data can be compared against a maximum height reference value, etc.

Another example of additional filtering that can be provided is historical filtering. More specifically, e.g., if the speed-based filtering of a mobile unit does not indicate the mobile unit as vehicle-born in step S208, the VDU 120 can determine if data for the mobile unit was previously treated as being vehicle-born (such that data for the mobile unit was treated as representing data for the vehicle). If so, this can indicate several possibilities such as: the mobile unit is no longer vehicle-born; or the vehicle is caught in slow traffic or a traffic-jam situation; or the vehicle has been parked; or the vehicle has stopped off the road but not in a parking area (possibly due to an accident or some other unusual situation), etc. The VDU 120 can then look at data for other vehicles proximal to the presently-considered vehicle to determine if they likewise have slowed down or are stopped, which would be indicative of a traffic slow-down or a traffic jam and/or do the position-based types of filtering (step S210), etc.

Where position-data is only two-dimensional, there can be situations in which the footpath database 126 overlaps the road database 124. For example, there can be a pedestrian overpass across a roadway. If a mobile unit 110 is in a vehicle 108 moving slowly, or that is stopped, underneath the overpass, then two-dimensional position data could yield indeterminate results indicating that the mobile unit 110 was both on the road and on a footpath (the overpass). The altitude component of three-dimensional position-data can be used to resolve such indeterminacy.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed is:

1. A method for gathering vehicular traffic data based upon location data for one or more mobile units, the method comprising:

generating vehicle traffic data representing a position of one or more vehicles based on raw location data representing a position of the one or more mobile units; wherein the generating step further includes, deriving speed data for the mobile units based upon the raw location data, respectively, and filtering, based upon the speed data, to discriminate which of the mobile units represent vehicles.

2. The method of claim 1, wherein the deriving speed data step includes:

deriving a distance moved between two successive positions of the mobile unit; and dividing the distance by an amount of time elapsed between when the two successive positions were determined.

3. The method of claim 1, wherein the filtering step includes:

comparing the speed data against a predetermined reference value; and treating, for those mobile units which the comparing step indicates are moving with vehicles, data for the mobile units as representing data for the vehicles, respectively.

4. The method of claim 3, wherein the predetermined reference value is a minimum speed (SMIN) for a typical vehicle, the comparing step compares the speed data against SMIN, and the treating step treats data for mobile units whose speed (S) is one of S>SMIN or S≧SMIN as representing data for the corresponding vehicles.

5. The method of claim 3, wherein the predetermined reference value is a maximum speed (SMAX) for a typical pedestrian, the comparing step compares the speed data against SMAX, and the treating step treats data for mobile units whose speed (S) is one of S>SMAX or S≧SMAX as representing data for the corresponding vehicles.

6. The method of claim 3, wherein the raw location data for a mobile unit includes an identifier of the mobile unit, position coordinates, and a time stamp indicating when the coordinates were determined; and the treating step includes:

assigning an identifier of the vehicle;

adopting, as vehicle data, the position coordinates and time stamps, respectively, of the mobile unit as position coordinates and time stamps for the vehicle;

incorporating the speed data for the vehicle as part of the vehicle data;

the vehicle traffic data representing an aggregate of the vehicle data resulting from the treating step.

7. The method of claim 6, wherein the assigning step assigns the vehicle identifier is based upon the mobile unit identifier.

8. The method of claim 3, wherein, for remaining mobile units not found to correspond to vehicles by the speed-based filtering step, the generating step further includes:

filtering, based upon the positions of the remaining mobile units, to discriminate which of the remaining mobile units represent vehicles.

9. The method of claim 8, wherein the position-based filtering step includes comparing the positions of the remaining mobile units against at least one of a road database of known vehicular traffic areas and a footpath database of known pedestrian traffic areas.

10. A method for gathering vehicular traffic data based upon location data for one or more mobile units, the method comprising:

generating vehicle traffic data representing a position of one or more vehicles based on raw location data representing a position of the one or more mobile units, wherein the generating step includes, filtering, based upon the positions of the mobile units, to discriminate which of the mobile units represent vehicles.

11. The method of claim 10, wherein the filtering step, for each mobile unit, includes:

comparing the position of the mobile unit against the contents of one or more databases of vehicle-relevant areas.

12. The method of claim 11, wherein the one or more databases of vehicle-relevant areas include a road database of known vehicular traffic areas; and the filtering step, for each mobile unit, includes:

comparing the position of the mobile unit against the road database; and treating, for those mobile units whose position is on or within a predetermined distance of a vehicular traffic area listed in the road database, data for the mobile units as representing data for the vehicles, respectively.

13. The method of claim 11, wherein the one or more databases of vehicle-relevant areas include a footpath database of known pedestrian traffic areas; and the filtering step, for each mobile unit, includes:

comparing the position of the mobile unit against the footpath database; and treating, for those mobile units whose respective position is either not on or not within a predetermined distance of a pedestrian traffic area listed in the footpath database, data for the mobile units as representing data for the vehicles, respectively.

14. The method of claim 10, wherein the raw location data for a mobile unit includes an identifier of the mobile unit, position coordinates, and a time stamp indicating when the coordinates were determined; and the position-based filtering step identifies ones of the mobile units that can be treated as representing vehicles;

the method further comprising:

treating each mobile unit identified by the position-based filtering step as a vehicle by assigning, an identifier of the vehicle; and adopting, as vehicle data, the position coordinates and time stamps, respectively, of the mobile unit as position coordinates and time stamps for the vehicle;

the vehicle traffic data representing an aggregate of the vehicle data resulting from the treating step.

15. A method for gathering vehicular traffic data based upon location data for one or more mobile units, the method comprising:

generating vehicle traffic data representing a position of one or more vehicles based on raw location data representing a position of the one or more mobile units, wherein the generating step includes, deriving distances moved between successive positions of the mobile units, respectively, and filtering, based upon the distances-moved, to discriminate which of the mobile units represent vehicles.

16. The method of claim 15, wherein the filtering step includes: comparing the distances against a predetermined reference value; and treating, for those mobile units which the comparing step indicates are moving with vehicles, data for the mobile units as representing data for the vehicles, respectively.

17. The method of claim 16, wherein the predetermined reference value is a minimum distance (DMIN) moved by a typical vehicle, the comparing step compares the distances against DMIN, and the treating step treats data for mobile units whose distance (D) is one of D>DMIN or D≧DMIN as representing data for the corresponding vehicles.

18. The method of claim 16, wherein the predetermined reference value is a maximum distance (DMAX) moved by a typical pedestrian, the comparing step compares the speed data against DMAX, and the treating step treats data for mobile units whose distance (D) is one of D>DMAX or D≧DMAX as representing data for the corresponding vehicles.

19. A method for gathering vehicular traffic data based upon location data for one or more mobile units, the method comprising:

generating vehicle traffic data representing a position of one or more vehicles based on raw location data representing a position of the one or more mobile units, wherein the raw location data for a mobile unit includes an identifier of the mobile unit, position coordinates, and a time stamp indicating when the coordinates were determined, and the traffic data for a vehicle includes an identifier of the vehicle, position coordinates for at least one position, and at least one time stamp corresponding to the position coordinates, respectively.

20. The method of claim 19, wherein the traffic data for a vehicle also includes speed data for the vehicle.

21. A method for gathering vehicular traffic data based upon location data for one or more mobile units, the method comprising:

receiving raw location data representing a position of the one or more mobile units;

filtering the raw location data to discriminate which of the mobile units represent vehicles, the filtering being based upon at least one of the following criteria speed data as derived from the raw location data for the mobile units, positions of the mobile units represented by the raw location data, and distances-moved as derived from the raw location data for the mobile units; and generating vehicular traffic data, for each mobile unit identified as a vehicle according to the filtering step, by assigning an identifier of the vehicle, and adopting, as vehicle data, at least the position coordinates and time stamps, respectively, of the mobile unit as position coordinates and time stamps for the vehicle.

* * * * *